455-1 SR

8/5/80 XR 4,216,546

United States Patent [19]

Litt

[11] 4,216,546

[45] Aug. 5, 1980

[54] FREQUENCY BANDWIDTH TUNING SYSTEM AND METHOD

[75] Inventor: Eric S. Litt, Wanamassa, N.J.

[73] Assignee: The United States of America as represented by the Secretary of the Army, Washington, D.C.

[21] Appl. No.: 933,703

[22] Filed: Aug. 15, 1978

[51] Int. Cl.[2] .......................... H04K 3/00; H04B 1/32

[52] U.S. Cl. ........................................ 455/164; 455/1; 455/75; 455/77

[58] Field of Search .................... 343/18 E; 324/78 D, 324/79 D; 325/455, 17, 25, 132, 332, 335, 469, 470, 418, 419, 420, 421, 427

[56] References Cited

U.S. PATENT DOCUMENTS 3,571,760 3/1971 Schwartz et al. ................. 324/79 D

*Primary Examiner*—Benedict V. Safourek
*Attorney, Agent, or Firm*—Nathan Edelberg; Jeremiah G. Murray; Daniel D. Sharp

[57] ABSTRACT

An electronic system for scanning across a range of received signals and obtaining a digital representation of a predetermined position, for example, the mid-point, of the bandwidth of the received signal, without having to ascertain directly the frequency at said predetermined position. The system can include a homodyne receiver (zero-beat reception) using a voltage controlled local oscillator or a superheterodyne receiving using a local oscillator for producing an intermediate frequency.

9 Claims, 4 Drawing Figures

FREQUENCY BANDWIDTH TUNING SYSTEM AND METHOD

The invention described herein may be manufactured and use by or for the Government for governmental purposes without the payment of any royalties thereon or therefor.

BACKGROUND OF THE INVENTION

The system of the present invention relates to an electronic system and method for tuning frequency controlled devices.

At the present time it is sometimes necessary or useful to determine the frequency of a received broadcast signal and to tune a radio broadcast transceiver to the same frequency. For example, if one wishes to "jam", i.e., disturb, the radio communication, between enemy troops, one must first find the frequency upon which they are broadcasting and then tune a radio transmitter to the same frequency and broadcast a noise to drown out their messages. This can be done manually by turning the dial of a radio receiver until it receives an enemy broadcast seeing the frequency, on a dial, at which the broadcast is made and manually tuning the jamming radio transmitter to the same frequency.

This procedure has many limitations. It is slow, so that the enemy may be able to complete its message before the jamming broadcast is initiated. It depends upon the skill of the personnel; the frequency may be misjudged if the personnel is unskilled, and skilled personnel may be unavailable or busy on other tasks. It can only be used with relatively long-range enemy broadcasts because the receiving and transmitting radios should be well behind friendly lines.

Some of these difficulties have been addressed by electronic devices which automatically detect the frequencies being utilized by an enemy and automatically tune a jamming radio transmitter to that frequency. An example of such a system is the military TLQ-17A Set-On Jammer which is described in Technical Manual TM-06241A-12. Such automatic devices may operate rapidly and without the attention of skilled personnel. However, generally such automatic devices have been relatively complex, expensive and burdensome to transport.

SUMMARY OF THE INVENTION

In accordance with one embodiment of the present invention a transceiver (combined radio receiver and transmitter) is provided which automatically is tuned to scan (automatically tuned back and forth) across a predetermined radio broadcast range of frequencies.

The scan tuning can be accomplished by varying the voltage (the control voltage) to a voltage controlled oscillator (VCO), such as a varactor tuned oscillator or by varying mechanically the tuning control of a local oscillator as used, for example, in a superheterodyne receiver. The control voltage is obtained in 4096 equal increments, in the range of 0 to 10 volts, from a 12-bit digital-to-analog (D/A) converter. When the receiver obtains an incoming signal, it starts sending its digital control section pulses with represent a beat or difference frequency. The beat frequency is taken between the internal voltage controlled local oscillator (VCO), i.e., the tuned frequency, and the incoming frequency.

When the receiver obtains an incoming signal, beat frequency pulses are produced and the scan rate may be slowed. When the receiver has scanned completely across the incoming signal's bandwidth, the beat frequency disappears. A counter counts the increments between the start of the beat frequency and its end, which coincides with the frequencies of the incoming signal. The digital control section may reverse and return to the center, i.e., the one-half count, of those incoming frequencies. The VCO may then be locked at that center of those frequencies.

The present invention is applicable to frequency controlled spectrometers (an instrument which determines the frequency distribution of a source and displays its components) and to radio transceivers (combination of radio receiver and transmitter). The system is also applicable to any device which is tuned by a controlled local oscillator. The present invention is applicable to both homodyne receivers (reception using a locally generated voltage at the carrier frequency, sometimes called "zero-beat reception") and heterodyne receivers (reception by combining a received high-frequency wave with a locallv generated wave to produce sum and difference frequencies at the output, also called "beat reception"), which produce pulses at the difference frequency which are interpreted by the digital control system of the present inventon.

The control system of the present invention provides for automatic frequency identification and tuning. The system contains two counters (a cicuit which counts input pulses, for example, producing a binary word which increases by one upon each input pulse), which digitally characterize the input frequency signal according to pre-specified criteria.

The first counter is an identity counter which assigns a digital designation to each frequency with a channel. The second counter is a measuring counter which counts the number of frequency increments within the channel bandwidth. The second counter preferably counts every other frequency increment to effectively generate a value representative of half the channel bandwidth. Once the receiver has scanned to the end of the signal bandwidth, the first counter will contain a digital value representative of the last frequency in the channel signal bandwidth, the second counter will contain a digital number representative of half the number of frequency increments in the signal bandwidth. At the conclusion of scanning the signal bandwidth the identity counter contains the digital designation of the last difference frequency of the received signal. The measuring counter counts down the number of counts and the identity counter will then contain a digital representation of either the center of the received signal channel bandwidth (or some other predetermined position within said signal channel bandwidth).

The measuring counter can be made to count every other frequency increment by, for example, slowing the counting rate. If the measuring rate of count is one half the identity rate of count, the system will select the center frequency. However, other relative rates of count are intended to be within this invention in order to generate other relative positions.

The digital frequency values of the identity counter are continuously applied to the digital-to-analog converter to produce a voltage signal which regulates the voltage controlled oscillator and which in turn tunes the frequency controlled device.

As previously stated, the system may incorporate a superheterodyne receiver, in which case, a digital-to-synchronous converter, for example, can be substituted for the analog-to-digital converter with the output of such a converter used to control the frequency of the local oscillator.

OBJECTIVES AND FEATURES OF THE PRESENT INVENTION

It is an objective of the present invention to provide a frequency control system for the automatic identification and selection of a particular frequency which is at a prespecified position within the signal bandwidth. The digitally implemented control system of the present invention provides an inexpensive yet accurate system for such frequency selection.

The system of the present invention additionally provides for both digital signal band measurement and digital identification of individually selected frequencies. The control system may additionally provide digital read-outs of the tuned frequencies.

Other objectives of the present invention will be apparent from the following detailed description of the invention which should be taken in conjunction with the accompanying drawings, which description, including those drawings, provides the best mode presently contemplated by the inventor to carry out the invention, and which description would enable any person skilled in the art to practice the invention. In the drawings.

DETAILED DESCRIPTION OF THE INVENTION

The automated digital frequency control system of the present invention may employ off-the-shelf electronic digital integrated circuit (IC) components. The system includes at least two independent counters which may be simply and inexpensively constructed as an arrangement of flip-flops which produce a binary word (by sequentially changing states according to a known order upon receiving an appropriate control signal). The circuit also comprises a plurality of individual flip-flops. Each flip-flop is one of three types, depending on its use. The delay flip-flop holds the input signal until an appropriate clock pulse is received whereupon the input signal is gated to output. These are used to provide signal isolation and enable clocked or timed controls. The J-K flip-flops create a phase delay, that is, a signal whose lead edge was previously high at time $t_1$, $t_2$, $t_3$, $t_4$ may be converted to a signal which is high at times $t_2$, $t_4$. These are particularly important for producing delayed time signals. The final type flip-flop is the output variety which is independently powered and receives only one control signal. These function to assure discrete properly shaped output pulses to interface with other components.

Another component employed in the control system is the NAND gate which is a binary logic component which produces a low output only when both inputs are high, that is, the output will be high whenever at least one input is low. This device facilitates the logic operations of the circuit. For example, when the two input signals are high the NAND gate produces a low signal which may be used as a control signal.

Figure 1:
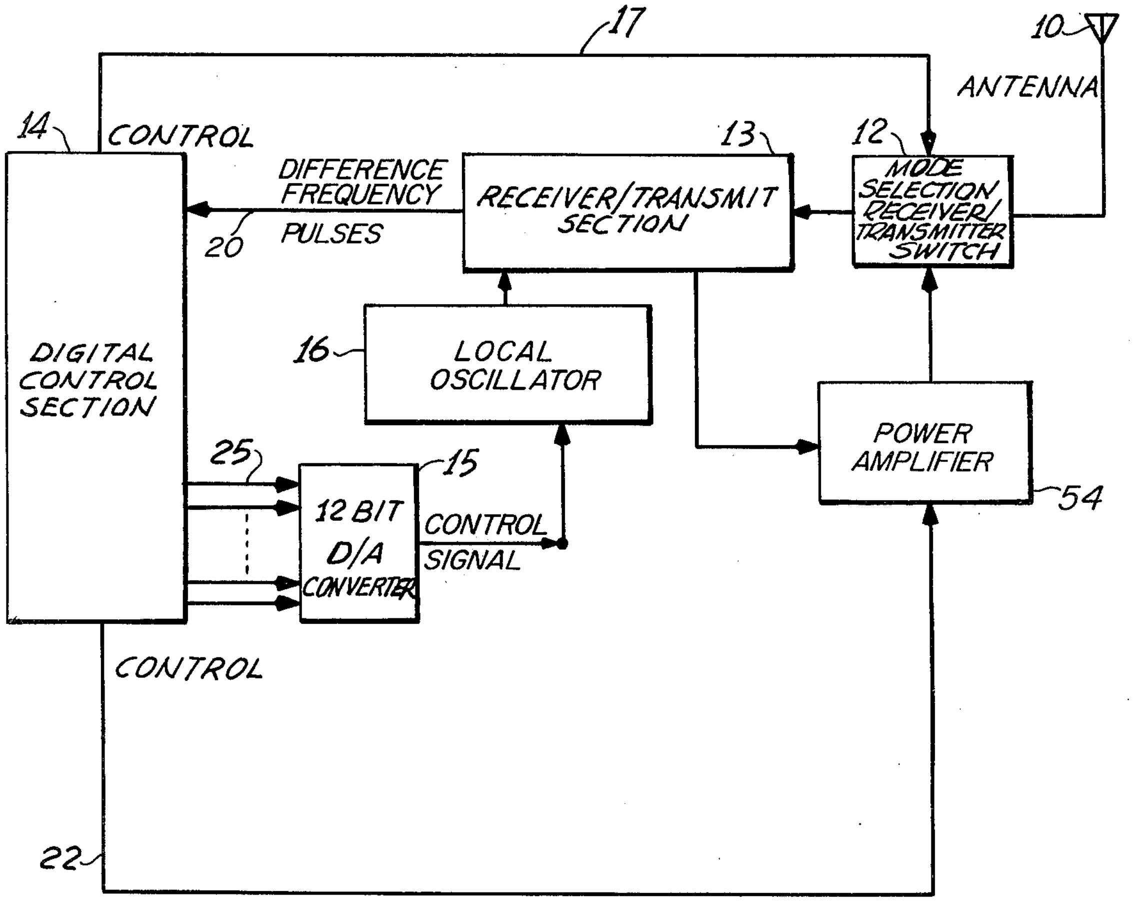
FIG. 1 is a block diagram of a digital control system of the present invention as incorporated in a radio transceiver system.

FIG. 1 depicts the system of the present invention incorporated in a radio transceiver. The receiver portion includes a local oscillator 16 which may be a voltage controlled oscillator. In the receiver mode of operation the broadcast received signal wave is detected by the antenna 10 and travels through the mode selection receiver/transmitter R/T switch 12 to the receiver/-transmit section 13. The receiver/transmit section 13, in combination with the voltage controlled oscillator 16, produces beat frequency pulses representative of the signal received. The receiver/transmit section 13 may process the beat frequency pulses to the digital control section 14. Alternatively, the transceiver may only direct the beat frequency pulses to the digital control section 14, for instance, when information processing is not important. For example, information processing need not be conducted during the bandwidth scan operation, i.e., when the tuning of the receiver scans its entire bandwidth.

The digital control section 14 interprets the beat frequency pulses according to a prespecified criteria and generates the control signal in digital form on 25. The digital control signal is processed by a digital-to-analog converter 15 to produce a voltage signal which controls the voltage controlled oscillator 16. Alternatively, the digital control signal may be processed by a digital-to-synchronous converter including a servo mechanism for rotating the tuning control of a local oscillator used in a superheterodyne receiver. Consequently, the transceiver may be tuned to a frequency which has met the specified criteria. Such criteria, for example, may include: (i) the tuned frequency shall be at a prespecified relative position in the signal bandwidth, for example, its center; (ii) the selected signal bandwidth shall not exceed a specified number of frequencies; (iii) the signal bandwidth shall be the widest bandwidth of all signals on that band; (iv) the signal bandwidth shall not be initiated with a 4 millisecond pause; and (v) the signal bandwidth shall begin with four consecutive beats. Numerous other signal criteria are readily available to specify which signal is to be processed.

The control signal (the voltage signal) may be used to tune to a particular frequency within the specified signal bandwidth. The digital control section 14 may also be used to initiate other control signals 22 such as (i) a mode selection control signal which switches the transceiver from, for instance, receive to transmit mode; (ii) information generation control signal for transmitting prespecified information such as a Mayday or Noise signal; and (iii) output power amplified control signal, which enables transmission.

Figure 2:
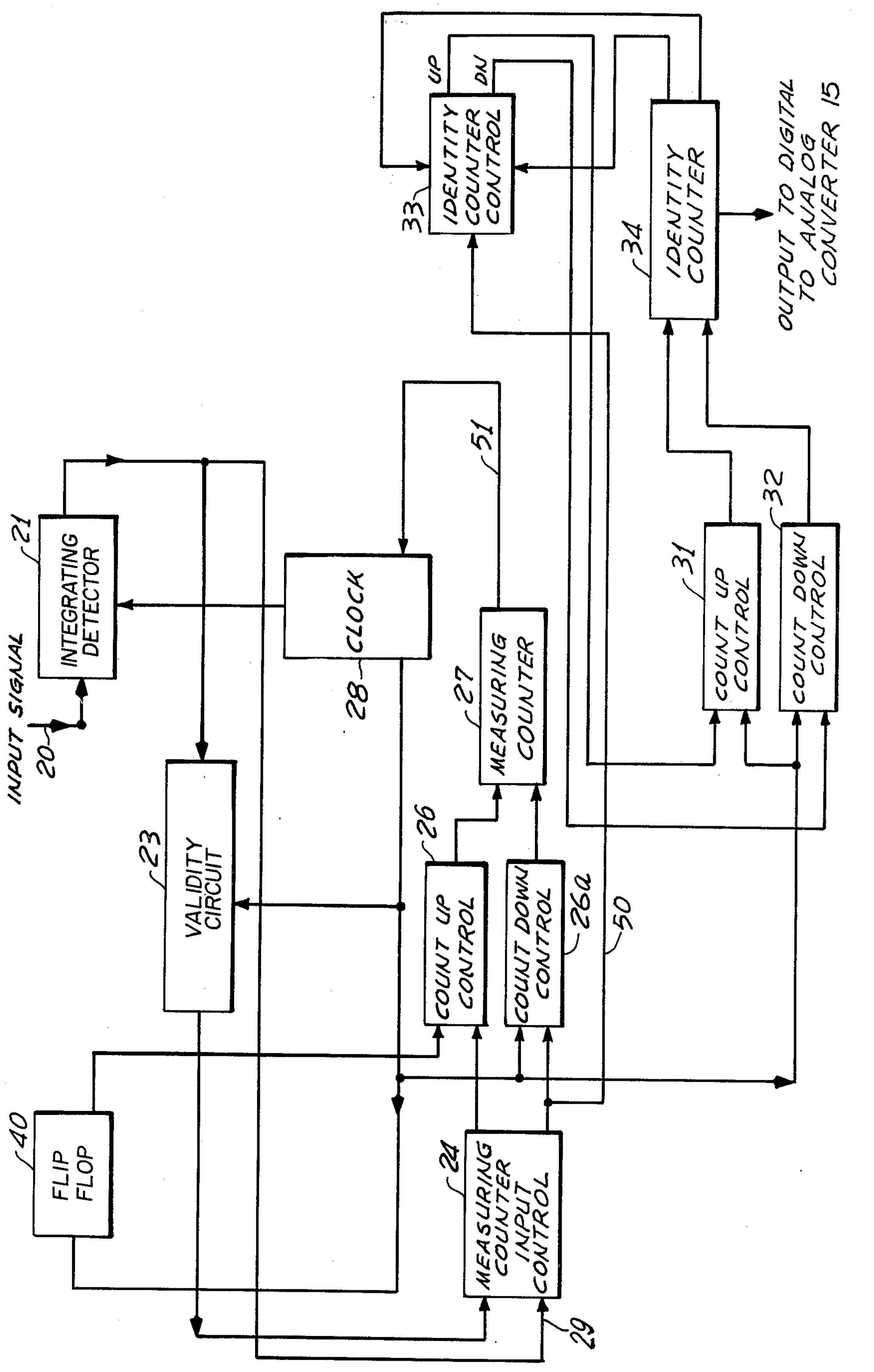
FIG. 2 is a block diagram of one implementation of the digital control section of the present invention.
Figure 4:
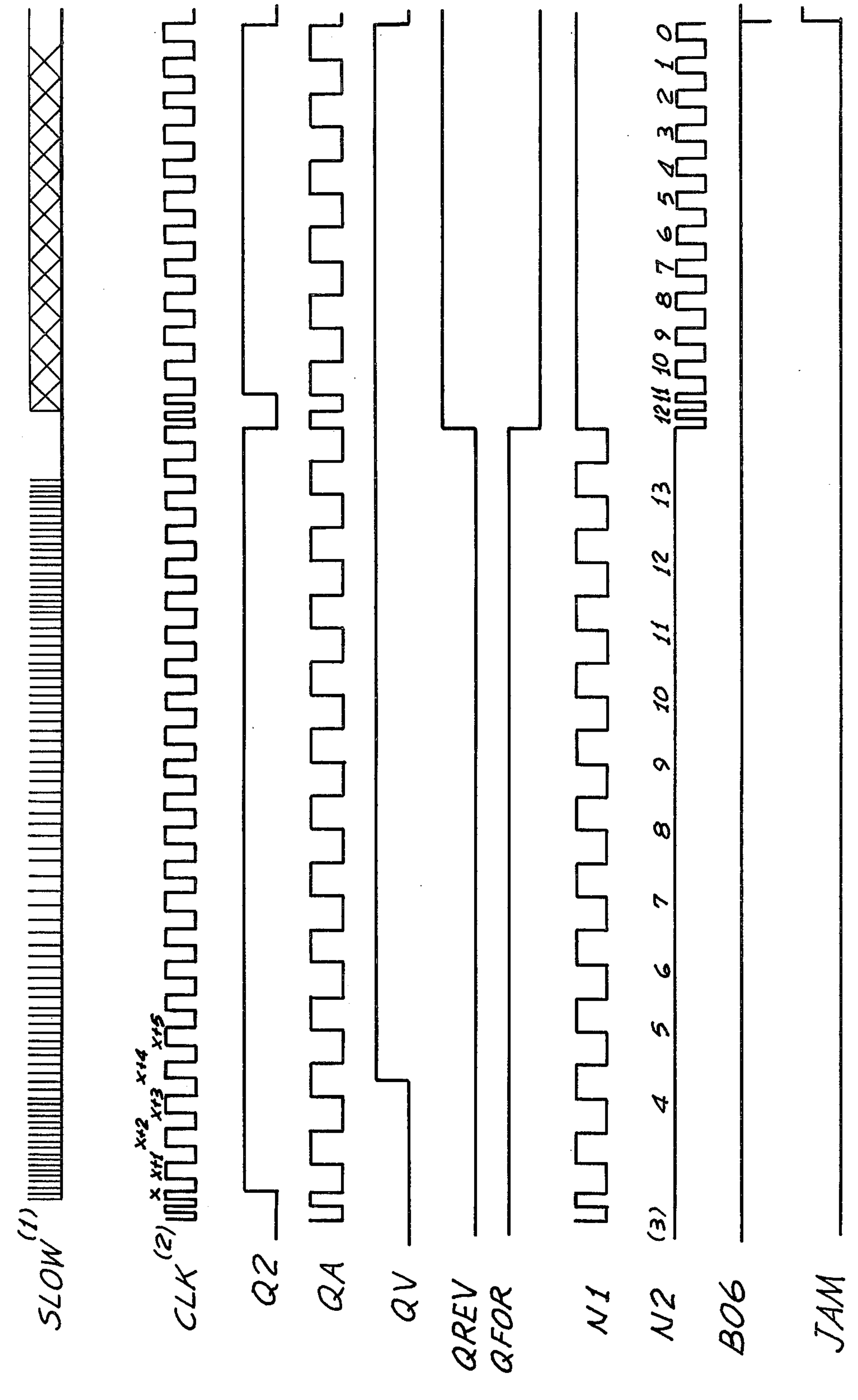
FIG. 4 indicates the relative control pulses of the present invention.

Referring now to FIG. 2, input beat frequency pulse signals 20 are converted to a digital signal by the integrating detector 21. This integrated signal Q2 from detector 21 is then subjected to validity analysis by the validity circuit 23. The validity circuit output QV of FIG. 4 is applied to the measuring counter input control 24 which supplies appropriate inputs to the measuring counter controls 26, 26a to control the direction of counting of measuring counter 27.

The count-up control 26 also is receptive of the output of power amplifier 54 and the flip flop 40; the latter divides the count of clock 28 by two (or some other predetermined amount depending on the predetermined position of the frequency increment desired to be selected within the received signal bandwidth, if other than the center of the received signal bandwidth or spectrum). Consequently, the measuring counter 27 can count up no faster than the rate of the delayed clock.

The measuring counter countdown is controlled by the countdown control 26a which is governed by the normal clock signal 28 and the signal 50 from the measuring counter input control 24 when the beat frequency signals cease, or, more particularly, when the detector 21 output waveform Q2 goes negatively. Accordingly, the measuring counter 27 counts down at the normal clock rate. The relative rate differential is an indication of the positional bandwidth fraction which the measuring counter measures.

The identity counter 34 generates a digital value which is representative of the frequency of the tuned signal. The identity counter control 33 generates either a count-up or a countdown control signal. The identity counter 34 counts continuously during frequency scan. The identity counter control 33 will remain as either a count-up or a countdown signal as long as the direction control signal 50 is unchanged. That is, the measuring input control 24 produces a control signal 50 which toggles the identity counter control 33 and causes the direction of count of counter 34 to be reversed. Signal 50 will be produced when the limits of the receiver frequency bandwidth has been reached. The identity counter count-up and countdown controls 31 and 32 receive appropriate count signals from the identity counter control 33 and combine these with the clock pulses to provide control of the identity counter 34. Consequently, the identity counter counts up and down at the normal rate which is the same rate as the rate the measuring counter 27 counts down. The measuring counter 27 counts up at a slowed rate and the rate differential between count-up and countdown enables the selection of the frequency which is located at a relative position within the subject frequency bandwidth. The identity counter subsystem 31, 32, 33, 34 may be similar to the measuring counter subsystem **24, 26, 26*a*, 27 shown in FIG. 3** except that an additional counter stage is required since the bandwidth of the receiver is normally greater than the bandwidth of the received input signal.

When the measuring counter reaches an initial count a stop command 51 is issued to the clock 28 which inhibits further processing by the control system 14. The stop signal may be generated, for instance, by the counter borrow output.

The digital value residing in the identity counter 34 is indicative of the frequency located at the desired relative position within the signal bandwidth. The digital value of the identity counter has been continually processed by a digital-to-analog converter to regulate the voltage to the voltage controlled oscillator (VCO) 16 (of FIG. 1). Consequently, the transceiver is tuned, whether for scan or desired frequency, by the identity counter 34 through the voltage controlled oscillator 16 (VCO).

It should be appreciated that the digital value of the identity counter 34 may also be used to generate a digital LED display of the selected frequency.

The stop signal 51 issued by the measuring counter 27 announces the desired frequency has been achieved and consequently may also be used to switch the transceiver (of FIG. 1) from a receive mode to a transmit mode by signal 17 and mode selector switch 12.

The measuring counter 27 actually measures the width of the signal band. The counter 27 maximum count should be sufficient to cover adequately the received input signal bandwidth.

The frequency control system of the present invention is particularly applicable to scanning an entire frequency band and tuning to the center of a signal bandwidth. Consequently, the present invention is relevant to military applications such as Electronic Counter Measure (ECM), including signal jamming. In this particular application, input information could be disregarded, eliminating many receiver components. The output signal would be a noise signal of sufficient power to effectively cover the signal bandwidth. Effective signal jamming would be achieved by selecting the tuned frequency to be that of the center of the signal bandwidth.

Figure 3:
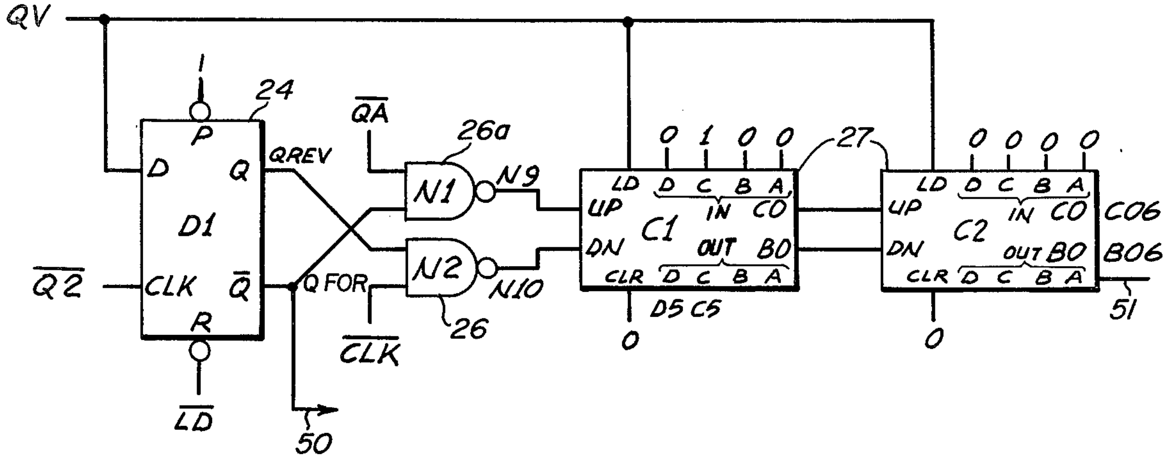
FIG. 3 is a circuit representation of the measuring counter and measuring counter control circuitry.

An embodiment of the frequency measuring circuit, i.e., a part of the "digital control section 14" of FIG. 1 using commercially available integrated circuits, is shown in FIG. 3, which is a circuit representation of blocks **24, 26, 26*a* and 27 of FIG. 3. The circuit comprises a D edge-triggered flip-flop $D_1$, two NAND gates $N_1$, $N_2$ and cascaded decade up-down counters $C_1$, $C_2$. These integrated circuit devices are off-the-shelf items and may be specified by their industry standard TTL designation as follows: $D_1$ is one-hald a Dual D edge-triggered flip-flop type 7474**, $N_1$ and $N_2$ together are one-half a quad 2—input NAND gate type 7400, $C_1$ and $C_2$ are cascaded 4-bit up/down counters type 74193. These devices are available from a suitable TTL manufacturer, such as Texas Instruments, Box 5012, Dallas, Texas 75222.

The edge-triggered flip-flop $D_1$ has an information input D which is transferred to the Q output whenever the clock input (CLK) changes from low to high. $\overline{Q}$ output is low when D is high and the clock changes. These outputs remain constant until changed. Flip-flop $D_1$ acts to accept and gate the control signal QV on clock count. The QV signal is generated by the signal discriminator validity circuit 23 of FIG. 2. As long as the bandwidth is being scanned QV is high and $\overline{Q}$ or QFOR is low, for each clock pulse Q2 which is generated by the integrating detector 21 of FIG. 2.

Q2 of D1 goes low approximately 2 CLK pulses (1 QA pulse) after the SLOW input signal pulses stop, indicating the local oscillator has passed completely through the frequency power bandwidth. When Q2 goes low, it makes QREV high and QFOR low. As QREV goes high just slightly before QFOR goes low, a count does not take place at the transition. The counters will now count down by CLK pulses from where they stopped.

The QFOR signal is applied to count up NAND gate $N_1$. $\overline{QA}$ is also applied to NAND gate $N_1$ and is the delayed clock signal from clock 40 of FIG. 2 which is essentially the normal clock divided by two. Consequently, the NAND gate output will be high when either input is low. The output of this NAND gate $N_1$ is connected to the count-up control of counter $C_1$ to increment the counter.

In an analogous manner the NAND gate $N_2$ output is used to decrement the counter $C_1$ but it must be realized that the count-down is at a normal rate as evidenced by the $\overline{CLK}$ (clock) input to the NAND gate $N_2$. This signal is derived from the normal clock 28.

Counter $C_1$ is connected in cascade fashion to counter $C_2$ by connecting the carry output $C_o$ of counter $C_1$ to the count-up input of counter $C_2$ and the borrow output $B_o$ of $C_1$ to the countdown input of counter $C_2$.

Additionally, it will be noted that QV is also applied to the load input of counters $C_1$ and $C_2$ to establish an initial value. The particular value of initialization as well as the need for initialization will depend on circuit parameters. In this particular embodiment of the invention, an initial value of four has been selected.

The decision to start counting up by CLK divided by 2 from the count of four may take in a number of factors. These factors may include (i) SLOW might appear a short time after CLK goes high and it is possible $Q_2$ will not go high until a CLK pulse later; (ii) QV goes high 4 CLK pulses later; and (iii) $Q_2$ might not go low until 3 CLK pulses after the SLOW pulses disappear and due to a delay between the CLK pulses and lock oscillator response. Adding those delays, one obtains $1+4+3=8$ clock pulses and which, divided by 2 by the circuit, gives 4 clock pulses.

However, on count-down the counter will return to the initial count and the borrow output BO6 at 51 (see FIG. 2) may be used to initiate further activity such as signal jamming. Completion of the jamming cycle may occur, for instance, when the enemy ceases transmission. In such a case the $\overline{LD}$ signal which indicates jamming is complete may be applied to reset input of the edge-triggered input flip-flop $D_1$ to initialize the measuring circuit.

Additionally, counter outputs $D_5$ and $C_5$ may be applied to additional signal discrimination circuitry such as "Identification Friend or Foe" (IFF) circuitry, enabling friendly circuits to have a password in the form of a certain number of beat pulses.

FIG. 4 represents a timing diagram of the various control signals generated by the circuit. The SLOW signal is the input signal generated by the receiver and the processing of it provides for better noise immunity and an inexpensive way to tag a jamming signal.

CLK is the clock signal and determines the rate of bandwidth scan. A relatively high scan rate is desired for searching for a received input signal to permit accurate processing of the received input signal. Once a signal has been identified, the clock or frequency scan is slowed. This is indicated by the longer clock pulses. Q2 is generated by the integrating detector circuit; when Q2 is high, signal processing will occur.

QA represents the clock divided by two as generated by the flip flop delay clock 40. QV is the validity signal which is generated by the signal validity circuit 23 and indicates the signal being processed is more than mere noise.

Q REV and QFOR are the count up or down inputs to NAND gate $N_1$ and $N_2$ and are continuous for either forward or reverse scan of the signal channel bandwidth.

$N_1$ indicates the count-up pulses applied to counter $C_1$ are at the same rate as QA, that is, the divided clock rate. $N_2$ indicates the count-down rate which is at the normal clock rate indicated above by CLK.

BO6 is the borrow output which indicates the measuring counter has counted to the initial count. The pulse may be used to initiate a jamming transmission. The JAM signal will be continuously high during the jam period. The transition of this signal from high to low may be used to initialize the measuring counter control flip-flop $D_1$.

What is claimed is:

1. A clocked receiving system including a receiver having a controllable oscillator and capable of automatically sensing the frequency at a prespecified position within the bandwidth of a received input signal of frequency unknown at the receiving system, said receiver producing pulses at a difference frequency between said oscillator and said received signal, comprising clock means for providing a series of clock pulses at a given rate, clock rate division means responsive to said clock means for providing clock pulses at a reduced rate which is less than said given rate by an amount dependent upon said prespecified position, oscillator frequency control means including a first up-down counter responsive to pulses from said clock means for incrementally controlling the oscillator tuning frequency of said receiver over the bandwidth of said receiver as a function of the count of said first counter to effect an incremental scanning of the oscillator frequency back and forth over a range of discrete frequency increments during the operation of said clock means, measuring counter means including a second up-down counter responding to the presence of difference frequency pulses and to the output of said clock rate division means for counting up at said reduced rate during the presence of said pulses from an initial count up to a threshold count attained at occurrence of a difference frequency pulse corresponding to the maximum bandwidth of said received input signal, said measuring counter means including a control circuit responsive to cessation of said difference frequency pulses for changing the direction of counting of said first and second counters and for changing the counting rate of said second counter to that of said clock means, and clock inhibiting means responding to attainment of the initial count by the down-counting second counter for maintaining the incremental frequency count of said first counter and to hold the receiver at said predetermined position within the bandwidth of said received input signal.

2. A clocked receiving system according to claim 1 wherein said prespecified position is at the center of the bandwidth of the received input signal and said reduced clock rate is half that of said clock means.

3. A clocked receiving system according to claim 1 wherein said frequency control means includes a digital-to-analog converter for converting the digital count of said first counter to a tuning voltage for said controllable oscillator.

4. A clocked receiving system according to claim 1 wherein said frequency control means includes a digital-to-synchronous converter for converting the digital count of said first counter to a mechanical tuning control of said controllable oscillator.

5. A clocked receiving system according to claim 1 further including an integrating detector responsive to said difference frequency pulses for deriving an integrated pulse during the continued presence of said difference frequency pulses, and wherein said measuring counter means is receptive of said integrated pulse and said clock pulse for controlling said second counter.

6. A clocked receiving system according to claim 5 wherein said integrating detector is controlled by said clock means.

7. A clocked receiving system according to claim 5 wherein said oscillator frequency control means further includes a control assembly for said first counter and the measuring counter control circuit includes a bistable circuit an output of which increases upon cessation of said integrated pulse for introducing a count direction-changing input to said first counter.

8. A clocked receiving system according to claim 1 wherein said clock inhibiting means is the borrow output from said measuring counter.

9. A clocked receiving system according to claim 5 further including a validity testing circuit and wherein said measuring counter means is also receptive to the output of said validity testing circuit.

* * * * *